United States Patent
Kimata

(10) Patent No.: US 8,374,298 B2
(45) Date of Patent: Feb. 12, 2013

(54) RECEIVING APPARATUS AND METHOD

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 471 days.

(21) Appl. No.: 12/525,765

(22) PCT Filed: Mar. 12, 2009

(86) PCT No.: PCT/JP2009/054807
§ 371 (c)(1),
(2), (4) Date: Aug. 4, 2009

(87) PCT Pub. No.: WO2009/113639
PCT Pub. Date: Sep. 17, 2009

(65) Prior Publication Data
US 2011/0007852 A1 Jan. 13, 2011

(51) Int. Cl.
*H03D 1/04* (2006.01)
*H03H 7/30* (2006.01)
(52) U.S. Cl. .................. 375/346; 375/229
(58) Field of Classification Search .............. 375/130, 375/140, 141, 144, 229, 230, 232, 316, 346, 375/347, 348, 349, 350; 455/278.1, 130, 455/269, 272, 296, 295; 708/100, 200, 300, 708/322, 323, 400–406; 370/210, 203, 201
See application file for complete search history.

(56) References Cited

U.S. PATENT DOCUMENTS

| | | | |
|---|---|---|---|
| 2005/0053172 A1* | 3/2005 | Heikkila | 375/333 |
| 2006/0199557 A1* | 9/2006 | Kimata et al. | 455/213 |
| 2007/0058740 A1* | 3/2007 | Akahori | 375/260 |

FOREIGN PATENT DOCUMENTS

| | | |
|---|---|---|
| JP | 2007336532 A | 12/2007 |
| JP | 2008028515 A | 2/2008 |
| JP | 2008205697 A | 9/2008 |
| JP | 2009049491 A | 3/2009 |
| WO | 2007091590 A | 8/2007 |
| WO | 2007119280 A | 10/2007 |
| WO | 2008090764 A | 7/2008 |

OTHER PUBLICATIONS

International Search Report for PCT/JP2009/054807 completed Apr. 10, 2009.
X. Zhu et al, "Novel Frequency-Domain Equalization Architectures for a Single-Carrier Wireless MIMO System", IEEE VTC2002—Fall, p. 874-878, Sep. 2002.
M. Kimata et al., "A Study of Frequency Domain Demodulation Scheme in Uplink Single-Carrier IFDMA", 2006, Shingku Sodai, B-5-36.

(Continued)

*Primary Examiner* — David C. Payne
*Assistant Examiner* — Vineeta Panwalkar

(57) ABSTRACT

Disclosed is a MIMO receiving apparatus in which a residual interference calculation unit (17) inputs noise-suppressed frequency domain channel estimation values, output from FFT units (12-1-1 to 12-M-N), equalizing weights calculated by a weight calculating unit (13), equalized signals from equalization processing by an equalization filter (14) and reference signals generated by reference signal generating units (16-1 to 16-M) to calculate a residual interference, and the likelihood correction units (18-1 to 18-M) receive time domain equalized signal from the IDFT units (15-1 to 15-M) and the residual interference calculated by the residual interference calculation unit (17) to correct the likelihood of the equalized signal (FIG.1).

13 Claims, 11 Drawing Sheets

OTHER PUBLICATIONS

L. Wei et al., "Frequency-Domain Residual Interference Cancellation in Cyclic Prefix Assisted Single-carrier Communications", Vehicular Technology Conference, 2006. VTC 2006—Spring. IEEE 63rd, May 7, 2006, vol. 1, p. 77-80.

A. Nakajima et al., "Throughput Performance of Frequency-domain Iterative SIC with 2 Dimensional MMSE-FDE for SC-MIMO Multiplexing", IEICE Technical Report, vol. 105, No. 559, The Institute of Electronics, Information and Communication Engineers. Jan. 19, 2006, p. 53-58, RCS2005-133.

A Nakajima et al., "Throughput Performance of Frequency-domain Iterative PIC with 2 Dimensional MMSE Weight for SC-MIMO Multiplexing", IEICE Technical Report, vol. 105, No. 356, The Institute of Electronics, Information and Communication Engineers, Oct. 13, 2005, p. 19-24, RCS2005-88.

\* cited by examiner

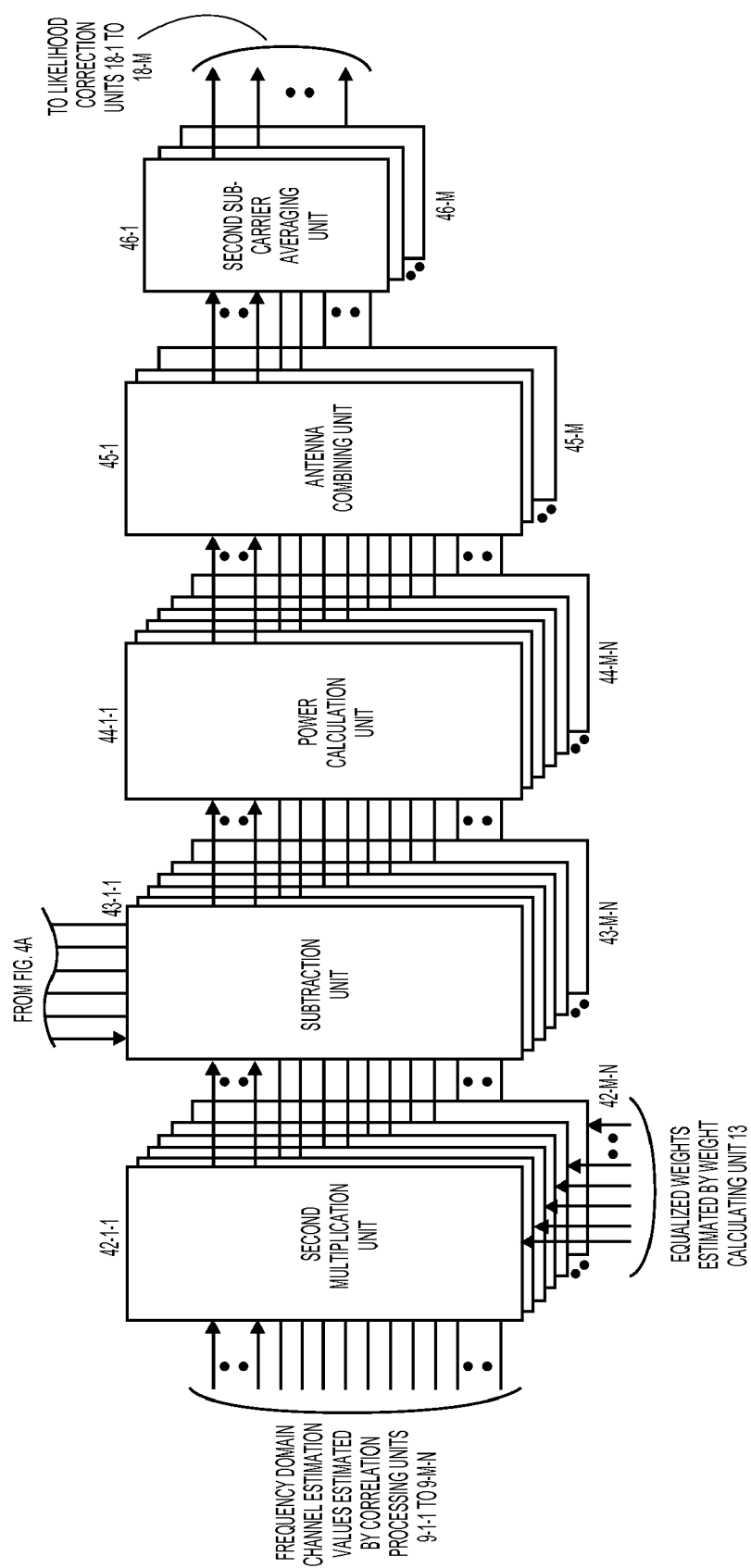

RECEIVING APPARATUS AND METHOD

This application is the National Phase of PCT/JP2009/054807, filed Mar. 12, 2009, which is based upon and claims the benefit of the priority of Japanese patent application No. 2008-064487, filed on Mar. 13, 2007, the disclosure of which is incorporated herein in its entirety by reference thereto.

TECHNICAL FIELD

This invention relates to a receiving apparatus and a receiving method. More particularly, it relates to a device and a method applied with advantage to a receiving apparatus of a MIMO system that transforms a plurality of single carrier signals received by a plurality of receive antennas into frequency domain signals to carry out signal demodulation by signal processing in the frequency domain.

BACKGROUND ART

In radio communication systems of next generation mobile communication, it is crucial to implement high speed data transmission. As a technique for implementing such high speed data transmission, a MIMO (Multiple Input Multiple Output) multiplexing system that simultaneously transmits signals at the same frequency from a plurality of transmission antennas and that demodulates (separates) the signals using a plurality of receive antennas, is attracting general attention.

FIG. 5 is a diagram of an arrangement of a typical MIMO transceiver device provided with an M-number of transmission antennas and an N-number of receive antennas, where M and N each denote an integer greater than or equal to 1. Referring to FIG. 5, the transmitting side includes transmission antennas 1-1 to 1-M and a transmitting apparatus 2, whereas the receiving side includes receive antennas 3-1 to 3-N and a receiving apparatus 4. The transmission antennas 1-1 to 1-M transmit respective different signals using the same frequency at the same time, and the receive antennas 3-1 to 3-N receive the signals, whereby high speed data transmission proportionate to the number of transmission antennas may be made without increasing the transmission bandwidth. The receiving side has to perform signal separation by demodulating signals received by the receive antennas 3-1 to 3-N into signals from the multiple transmission antennas 1-1 to 1-M.

Among a variety of methods for demodulating MIMO multiplexed signal, a method of linear filter reception is used as a simpler method.

In case the MIMO multiplexing scheme is used for the single carrier signal, in addition to interferences from other transmission antennas, multipaths of a desired transmission antenna signal become interferences, and signal reception via a filter that simultaneously suppresses these interferences is effective. There has been proposed a frequency equalizer that performs this processing by signal processing in the frequency domain to appreciably reduce the computational load (See, for example, Non-Patent Document 1).

Since the frequency equalizer calculates equalizing weights, channel estimation in the frequency domain becomes necessary. There has been proposed a method of directly transforming a reference received signal into a frequency domain and correlation of the received signal with a reference signal is taken in the frequency domain to estimate channel estimation (See, for example, Non-Patent Document 2).

FIG. 6 is a diagram showing a configuration, as related technique, of using a frequency domain equalizer and frequency domain channel estimation as described in Non-Patent Documents 1 and 2 for a MIMO receiving apparatus of a single carrier signal. The following explanation is made of a MIMO receiving apparatus of the related technique, shown in FIG. 6, with the number of the transmission antennas of M and with the number of the receive antennas of N, where M and N are each an integer greater than or equal to 1. In FIG. 6, an internal configuration of a receiving block 100-1, associated with the first receive antenna, is shown. Receiving blocks 100-1 to 100-N are all of the same configuration. In the notation of the reference numerals, as used in the present specification, -1 and -N at the trailing ends of respective reference numerals denote that the components in question belong to the first block and the N'th block, respectively.

The MIMO receiving apparatus includes the following components:
cyclic prefix (CP) removing units 101-1 to 101-N;
fast Fourier transform (FFT) units 102-1 to 102-N;
subcarrier demapping units 103-1 to 103-N;
reference signal generating units 104-1 to 104-M;
correlation processing units 105-1-1 to 105-M-N;
IFFT (Inverse Fast Fourier Transform) units 106-1-1 to 106-M-N;
noise path removing units 107-1-1 to 107-M-N;
FFT units 108-1-1 to 108-M-N;
a weight calculating unit 109:
an equalization filter 110; and
IDFT (Inverse Discrete Fourier Transform) units 111-1 to 111-M.

The CP removing units 101-1 to 101-N each input a received signal and removes a portion corresponding to CP from the received signal.

The FFT units 102-1 to 102-N input the received signal from which CP is removed by the CP removing units 101-1 to 101-N and each perform $N_{FFT}$ point FFT (where $N_{FFT}$ is powers of 2) to output a received signal transformed into a frequency domain.

The subcarrier demapping units 103-1 to 103-N each input the received signal transformed into the frequency domain by the FFT units 102-1 to 102-N, select only the subcarrier of a desired user and decimate unneeded subcarriers.

The reference signal generating units 104-1 to 104-M generate reference signals used for processing for correlation with a reference received signal.

The reference signal generating units 104-1 to 104-M make use of
a ZF (Zero-Forcing) method that entirely cancels out a code characteristics of the reference received signal;
a MMSE (Minimum Mean Square Error) method that suppresses noise increase in the correlation processing; and
a clipping method.

The correlation processing units 105-1-1 to 105-M-N each estimate a channel estimation value in the frequency domain based on correlation processing of the reference received signals and the reference signals. A channel estimation value $H_{BF,m,n}(k)$ of a transmission antenna m ($1<=m<=M$) and a receive antenna n ($1<=n<=N$) for a subcarrier k ($1<=k<=N_{DFT}$) may be calculated by the following equation (1):

$$H_{BF,m,n}(k) = R_{RS,n}(k) X_m'(k) \qquad (1)$$

where $X_m(k)$ denotes a reference signal of the transmission antenna in for the subcarrier k generated by a relevant one of the reference signal generating units 104-1 to 104-M and $R_{RS,n}(k)$ denotes a reference received signal by the receive antenna n for the subcarrier k as obtained at a relevant one of subcarrier demapping units 103-1 to 103-N.

A suffix * denotes complex conjugate.

The IFFT units 106-1-1 to 106-M-N transform the channel estimation values in the frequency domain, estimated by the correlation processing units 105-1-1 to 105-M-N, into the channel response in the time domain.

The noise path removing units 107-1-1 to 107-M-N substitute zeros (0s) for signals (noise paths) at points including only noise to remove these noise-only point signals (noise paths) from the channel response which is an output of each of the IFFT units 106-1-1 to 106-M-N.

For each of the noise path removing units 107-1-1 to 107-M-N, a time window filter or noise threshold value control is used.

In the time window filter, it is supposed that the channel response is within a CP length, and signals of points other than the interval corresponding to the CP length are treated as a noise path and substituted with zeros (0s).

The noise threshold value control substitutes signals of points less than or equal to a preset threshold value with zeros (0s), as noise paths.

In case the time window filter and the noise threshold value control are used in conjunction, an average value of the noise outside the window of the time window filter may be used as a noise threshold value.

The FFT units 108-1-1 to 108-M-N each perform fast Fourier transform of the channel response from which the noise paths are removed by the noise path removing units 107-1-1 to 107-M-N, to output noise-suppressed channel estimation values in the frequency domain.

The weight calculating unit 109 inputs the noise-suppressed channel estimation values of the frequency domain, output from the FFT units 108-1-1 to 108-M-N, to calculate equalizing weights.

The weight calculating unit 109 generally uses an MMSE method or a ZF method.

The MMSE equalizing weight vector $W_m(k)$ of the transmission antenna m for the subcarrier k is calculated by the following equation (2):

$$W_m(k) = H_{AF,m}^H(k) \left[ \sum_{m'=1}^{M} H_{AF,m'}(k) H_{AF,m'}^H(k) + \sigma^2 I \right]^{-1} \quad (2)$$

where $H^H$ denotes a complex conjugate transpose of H;
$\sigma^2$ denotes a noise power; and
I denotes a unit matrix.

$H_{AF,m}(k)$ is an estimated channel vector between a transmission antenna m and a receive antenna for the subcarrier k. The estimated channel vector $H_{AF,m}(k)$ and the equalizing weight vector $W_m(k)$ are defined respectively by the equations (3) and (4):

$$H_{AF,m}(k) = [H_{AF,m,1}(k), H_{AF,m,2}(k), \ldots, H_{AF,m,N}(k)]^T \quad (3)$$

$$W_m(k) = [W_{m,1}(k), W_{m,2}(k), \ldots, W_{m,N}(k)]^T \quad (4)$$

where T denotes transpose, and
each element of the estimated channel vector $H_{AF,m}(k)$ denotes a channel estimation value of the noise-suppressed frequency domain as an output of each of the FFT units 108-1-1 to 108-M-N.

The equalization filter 110 inputs the equalizing weights, calculated by the weight calculating unit 109, and the received signals, obtained by the subcarrier demapping units 103-1 to 103-N, to equalize the received signals in the frequency domain.

A transmission signal vector Y(k) for the subcarrier k, equalized and subjected to signal separation by the equalization filter 110 is calculated as shown in the equation (5), and defined by the equation (6):

$$Y(k) = W(k) R_D(k) \quad (5)$$

$$Y(k) = [Y_1(k), Y_2(k), \ldots, Y_m(k)]^T \quad (6)$$

where W(k) denotes a matrix of equalizing weights for the subcarrier k, and
$R_D(k)$ denotes a received signal vector for the subcarrier k. W(k) and $R_D(k)$ are respectively defined by equations (7) and (8), as given hereinbelow, respectively.

The elements of the received signal vector $R_D(k)$ denote received signals in the frequency domain as obtained by the subcarrier demapping units 103-1 to 103-N.

$$W(k) = [W_1(k), W_2(k), \ldots, W_M(k)]^T \quad (7)$$

$$R_D(k) = [R_{D,1}(k), R_{D,2}(k), \ldots, R_{D,N}(k)]^T \quad (8)$$

The inverse discrete Fourier transform (IDFT) units 111-1 to 111-M input equalized frequency domain signals, output by the equalization filter 110, to perform MDR-points IDFT, where $N_{IDFT}$ is an integer greater than or equal to 2, thereby transforming the signals into time domain signals, which are output as demodulated signals.

Non-Patent Document 1:
Xu Zhu and Ross D. Murch, "Novel Frequency-Domain Equalization Architectures for a Single-Carrier Wireless MIMO System,", IEEE VTC2002-Fall, pp. 874-878, September 2002.

Non-Patent Document 2:
Kimata and Yoshida, "A Study of Frequency Domain Demodulation Scheme in Uplink Single-Carrier IFDMA", 2006 Shingku Sodai, B-5-36.

SUMMARY

The entire disclosures of the above-described Patent Documents are incorporated by reference herein. The following is an analysis of the related art by the present invention.

In the above described MIMO receiving apparatus, there is the following problem:

If the MIMO multiplexing system is used for a single carrier signal, not only the interference from other transmission antenna, but also the multipaths of a desired transmission antenna signal forms interferences. Thus, a frequency domain equalizer, simultaneously suppressing these interferences, is used. However, if multipath interference resulting from other transmission antennas and from multipaths should increase, performance is degraded significantly due to noise amplification caused by equalization and to residual multipath interference.

To moderate this performance degradation, an interference canceller or turbo equalization may be used. This solution may not be realistic in consideration of increase in the computational load or in the processing delay.

It is therefore an object of the present invention to provide a MIMO receiving apparatus and a MIMO receiving method that transforms a single carrier signal into a frequency domain signal and that performs processing for equalization by signal processing in the frequency domain, in which it is possible to improve an equalization performance.

To solve the one or more of above problems, in one aspect of the present invention provides, there is provided a receiving apparatus of a MIMO system that transforms a single carrier signal into a frequency domain signal and that performs processing of equalization by signal processing in the frequency domain, in which the receiving apparatus comprises a residual interference calculation unit that calculates a residual interference due to an interference from other transmission antenna and to a multipath interference, and a likelihood correction unit that corrects the likelihood of an equalized signal using the residual interference.

In another aspect of the present invention, there is provided a receiving apparatus of a MIMO system that transforms a single carrier signal into a frequency domain signal and that performs processing of equalization by signal processing in the frequency domain, in which the receiving apparatus comprises an EFT unit, a weight calculation unit, an equalization filter, a residual interference calculation unit, an IDFT unit and a likelihood correction unit. The FFT unit outputs a noise-suppressed frequency domain channel estimation value, and the weight calculation unit calculates an equalizing weight from the noise-suppressed frequency domain channel estimation value output from the FFT unit. The equalization filter performs the processing of equalizing a received signal in a frequency domain by the equalizing weight, and the residual interference calculation unit calculates residual interferences due to an interference from other transmission antenna and to a multipath interference. The IDFT unit transforms a frequency domain equalized signal by the equalization filter into a time domain equalized signal, and the likelihood correction unit corrects the likelihood of the equalized signal using the time domain equalized signal by the IDFT unit and the residual interference calculated by the residual interference calculation unit. According to the present invention, the receiving apparatus further comprises a reference signal generating unit that generates a reference signal used for calculating the residual interference. The residual interference calculation unit calculates the residual interference using a noise-suppressed frequency domain channel estimation value as output from the FFT unit, an equalizing weight as calculated by the weight calculation unit, an equalized signal from the equalization filter, and a reference signal generated by the reference signal generating unit.

In a further aspect of the present invention, there is provided a receiving apparatus of a MIMO system that transforms a single carrier signal into a frequency domain signal and that performs processing of equalization by signal processing in the frequency domain, in which the receiving apparatus further comprises a correlation processing unit, an FFT unit, a weight calculation unit, an equalization filter, a residual interference calculation unit, an IDFT unit, and a likelihood correction unit. The correlation processing unit estimates a frequency domain channel estimation value by correlation processing of a reference received signal and a reference signal, and the FFT unit outputs a noise-suppressed frequency domain channel estimation value. The weight calculation unit calculates an equalizing weight from the noise-suppressed frequency domain channel estimation value output from the FFT unit, and the equalization filter performs the processing of equalizing a received signal in a frequency domain by the equalizing weight. The residual interference calculation unit calculates residual interferences due to an interference from other transmission antenna and to a multipath interference, and the IDFT unit transforms a frequency domain equalized signal from the equalization filter into a time domain equalized signal. The likelihood correction unit corrects the likelihood of the equalized signal using the time domain equalized signal by the IDFT unit and the residual interference calculated by the residual interference calculation unit. According to the present invention, the residual interference calculation unit calculates the residual interference using a frequency domain channel estimation value as estimated by the correlation processing unit, noise-suppressed frequency domain channel estimation values as output from the FFT unit, an equalizing weight estimated by the correlation processing unit, and an equalizing weight calculated by the weight calculation unit.

In a receiving method, according to the present invention, that transforms a single carrier signal into a frequency domain signal and that performs signal equalization by signal processing in the frequency domain, a residual interference due to an interference from other transmission antenna and to a multipath interference is calculated, and the likelihood of the equalized signal is corrected using the residual interference.

In a further aspect of the present invention, there is provided a receiving method that transforms a single carrier signal into a frequency domain signal and that performs signal equalization by signal processing in the frequency domain. With the receiving method of the present invention, a noise-suppressed frequency domain channel estimation value is output, and an equalizing weight is calculated from the noise-suppressed frequency domain channel estimation value. A received signal is equalized in a frequency domain by the equalizing weight to yield an equalized frequency domain signal, and residual interferences due to interferences from other transmission antennas and multipath interference are calculated. The equalized frequency domain signal is transformed into an equalized time domain signal, and the likelihood of the equalized signal is corrected using the equalized time domain signal and the residual interference. According to the present invention, the residual interference are calculated using the noise-suppressed frequency domain channel estimation value, the equalizing weight, the equalized signal and the reference signal.

In yet another aspect of the present invention, there is provided a receiving method that transforms a single carrier signal into a frequency domain signal and that performs signal equalization by signal processing in the frequency domain. With the receiving method according to the present invention, a frequency domain channel estimation value is estimated by correlation processing of a reference received signal and a reference signal, a noise-suppressed frequency domain channel estimation value is output, and an equalizing weight is calculated from the noise-suppressed frequency domain channel estimation value. A received signal is equalized in a frequency domain by the equalizing weight to yield an equalized frequency domain signal, and residual interferences due to interferences from other transmission antennas and multipath interference are calculated. The equalized frequency domain signal is transformed into an equalized time domain signal, and the likelihood of the equalized signal is corrected using the equalized time domain signal and the residual interference. According to the present invention, the residual interference are calculated using a frequency domain channel estimation value by the correlation processing, the noise-suppressed frequency domain channel estimation value and the equalizing weight.

Thus, in a method and an apparatus for transforming a single carrier signal into a frequency domain signal and for doing equalizing processing by signal processing in the frequency domain, the residual interference due to interference from other transmission antennas and to multipath interference are used according to the present invention for correction of the likelihood of an equalized signal, thereby realizing optimum equalization performance.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1A:
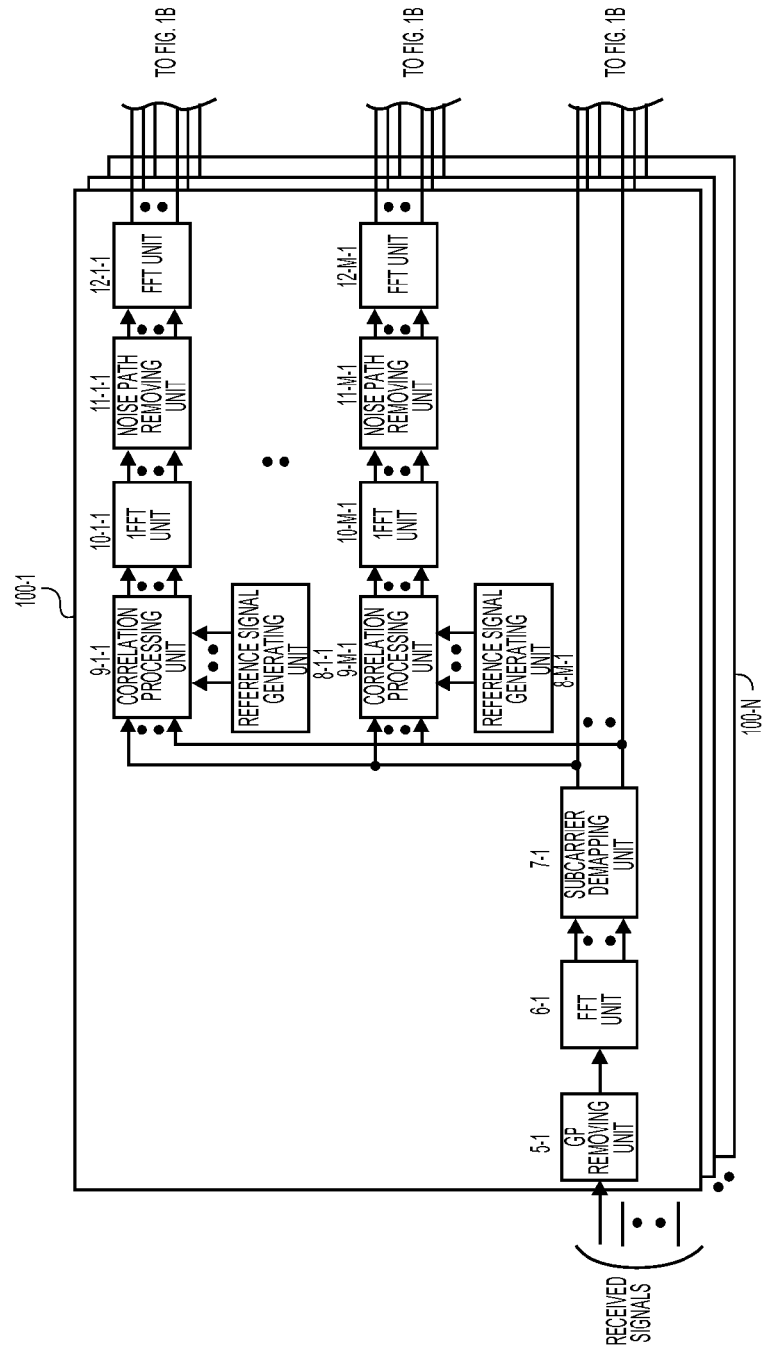
FIG. 1 is a block diagram showing a configuration of a MIMO receiving apparatus according to a first exemplary embodiment of the present invention.
Figure 1B:
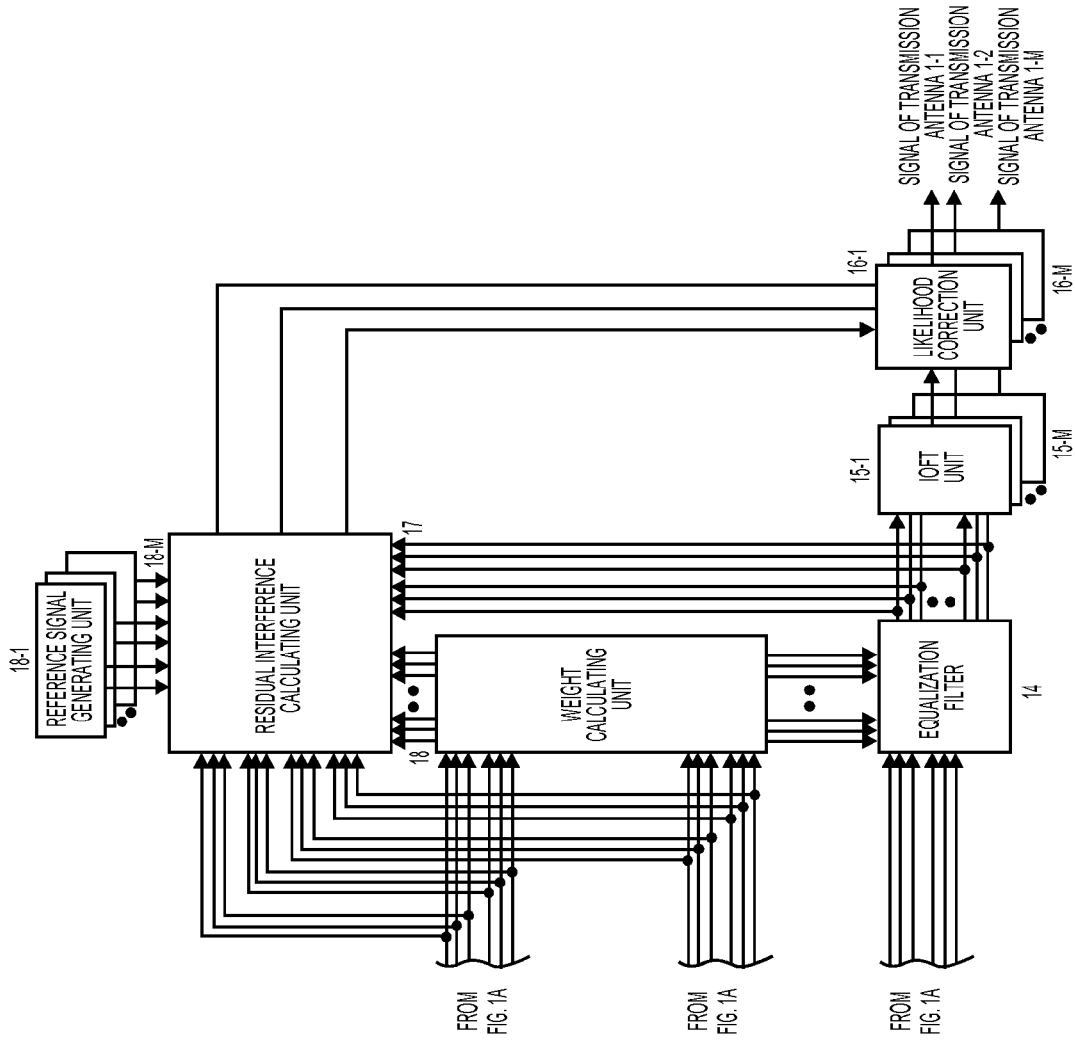

For further detailed description of the present invention, reference is made to the accompanying drawings. FIG. 1 is a block diagram showing a configuration of a MIMO receiving apparatus according to a first exemplary embodiment of the present invention.

Referring to FIG. 1, the MIMO receiving apparatus, with the number of the transmission antennas being M and that of the receive antennas being N, where M and N are each an integer greater than or equal to 1, is described.

Referring to FIG. 1, the MIMO receiving apparatus of the present exemplary embodiment includes:
CP removing units 5-1 to 5-N;
FFT units 6-1 to 6-N;
subcarrier demapping units 7-1 to 7-N;
reference signal generating units 8-1 to 8-M;
correlation processing units 9-1-1 to 9-M-N;
IFFT units 10-1-1 to 10-M-N;
noise path removing units 11-1-1 to 11-M-N;
FFT units 12-1-1 to 12-M-N;
a weight calculating unit 13;
an equalization filter 14;
IDFT units 15-1 to 15-M;
reference signal generating units 16-1 to 16-M;
a residual interference calculation unit 17; and
likelihood correction units 18-1 to 18-M. The functions and operations of these units will now be described.

The CP removing units 5-1 to 5-N input the received signal to remove a signal portion corresponding to CP.

The FFT units 6-1 to 6-N each input a received signal from which CP is removed by the CP removing units 5-1 to 5-N, and each perform $N_{FFT}$ point FFT, where $N_{FFT}$ is powers of 2. The FFT units each output the received signal transformed into a frequency domain signal.

The subcarrier demapping units 7-1 to 7-N each input the received signal transformed into the frequency domain signal by the FFT units 6-1 to 6-N, and select only the subcarrier of a desired user to decimate unneeded subcarriers.

The reference signal generating units 8-1 to 8-M generate reference signals used for processing for correlation with reference received signals.

The reference signal generating units 8-1 to 8-M make use of a ZF method that entirely cancels out code characteristics of the reference received signals, a MMSE method that suppresses noise increase in the correlation processing, and a clipping method.

The correlation processing units 9-1-1 to 9-M-N estimate channel estimation values in the frequency domain by correlation processing of the reference received signals and the reference signals. The channel estimation value may be calculated by the equation (1).

The IFFT units 10-1-1 to 10-M-N transform the frequency domain channel estimation values, estimated by the correlation processing units 9-1-1 to 9-M-N, into the time domain channel response.

The noise path removing units 11-1-1 to 11-M-N substitute zeros (0s) for noise-only point signals (noise paths) to remove the noise-only point signals from the channel response output from the IFFT units 10-1-1 to 10-M-N.

The noise path removing units 11-1-1 to 11-M-N use time window filtering or noise threshold value control.

The time window filter presumes that the channel response is within the CP length, and substitutes zeros (0s) for signals of points other than the interval corresponding to the CP length as being noise paths.

Noise threshold value control substitutes zeros (0s) for the signals of points less than or equal to a preset threshold value as being noise paths.

If time window filtering and noise threshold value control are used in conjunction, an average value of the noise outside the window of the time window filter may be used as the noise threshold value.

The FFT units 12-1-1 to 12-M-N execute FFT of the channel response from which the noise paths are removed by the noise path removing units 11-1-1 to 11-M-N, to output noise-suppressed channel estimation values of the frequency domain.

The weight calculating unit 13 inputs the noise-suppressed channel estimation values of the frequency domain, output from the FFT units 12-1-1 to 12-M-N, to calculate equalizing weights.

The weight calculating unit 13 generally uses the MMSE method or the ZF method. The MMSE equalizing weight vector is calculated by the equation (2).

The equalization filter 14 inputs equalizing weights, calculated by the weight calculating unit 13, and received signals, obtained by the subcarrier demapping units 7-1 to 7-N, to equalize the received signals in the frequency domain.

A transmission signal vector, equalized and signal-separated by the equalization filter 14, is calculated using the equation (5).

The IDFT units 15-1 to 15-M input equalized frequency domain signals, output by the equalization filter 14, to perform IDFT with $N_{IDFT}$ points, where $N_{IDFT}$ denotes an integer greater than or equal to 2, thereby transforming the signals into time domain signals.

The reference signal generating units 16-1 to 16-M generate reference signals used for calculating the residual interference.

The residual interference calculation unit 17 inputs
noise-suppressed frequency domain channel estimation values output from the FFT units 12-1-1 to 12-M-N;

equalizing weights calculated by the weight calculating unit 13;

equalized signals obtained on equalization by the equalization filter 14; and reference signals generated by the reference signal generating units 16-1 to 16-M; and calculates the residual interference caused by interferences from other transmission antennas and by multipath interference.

The residual interferences In, in the transmission antenna m is calculated in accordance with the equation (10), using channel gains $G_m$ after equalization, expressed by the formula (9):

$$G_{m,n} = \frac{1}{N_{DFT}} \sum_{k=1}^{N_{DFT}} W_{m,n}(k) H_{AF,m,n}(k) \tag{9}$$

$$I_m = \frac{1}{N_{DFT}} \sum_{k=1}^{N_{DFT}} \sum_{n=1}^{N} |Y_{m,n}(k) - G_{m,n} X_m(k)|^2 \tag{10}$$

where $X_m(k)$ is a reference signal in the transmission antenna m for the subcarrier k generated in the reference signal generating units 16-1 to 16-M, and $Y_{m,n}(k)$ is an equalized signal of the transmission antenna m and the receive antenna n for the subcarrier k equalized by the equalization filter 14.

Figure 2A:
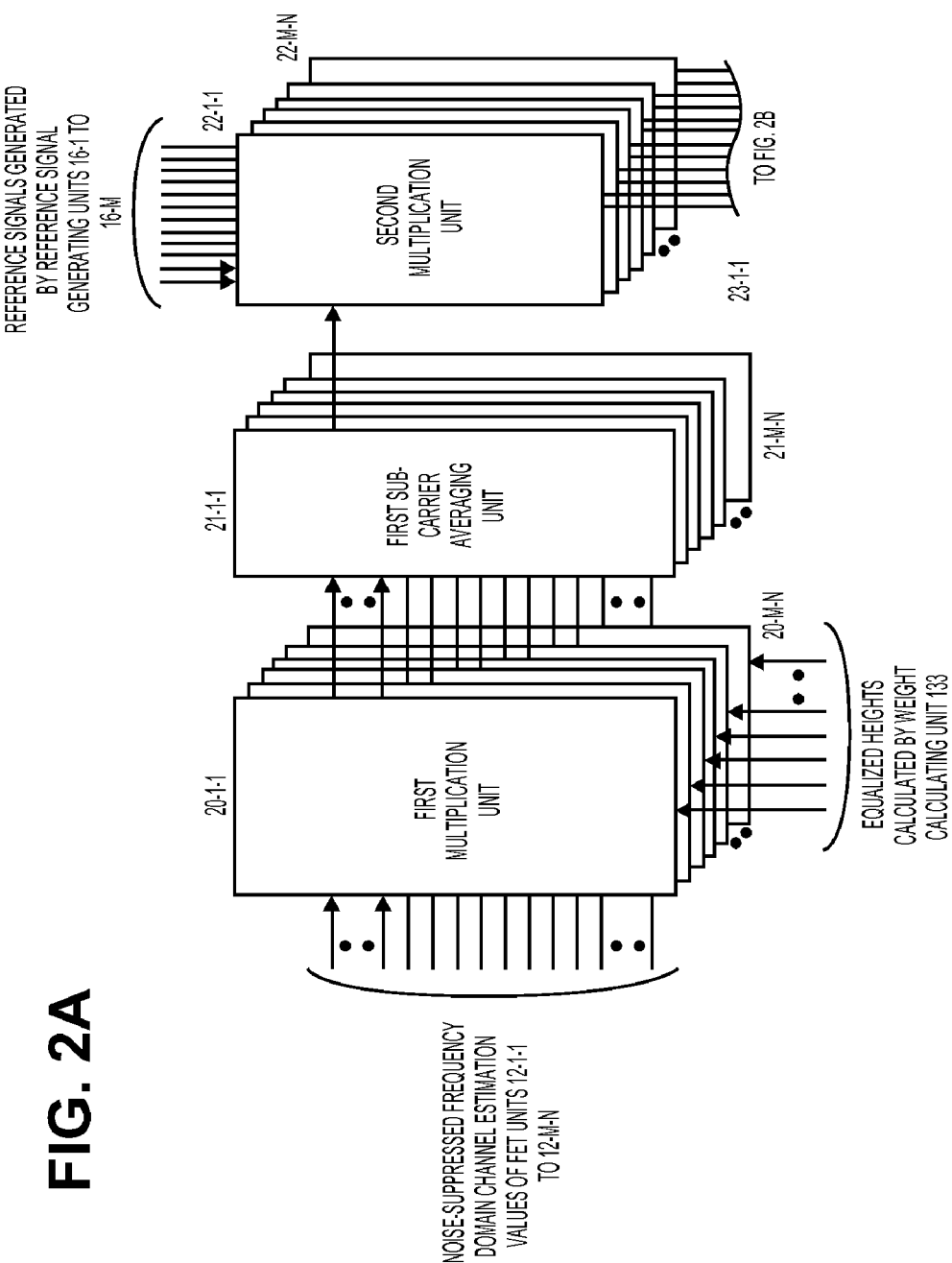
FIG. 2 is a schematic view showing a configuration of a residual interference calculation unit of the first exemplary embodiment of the present invention.
Figure 2B:
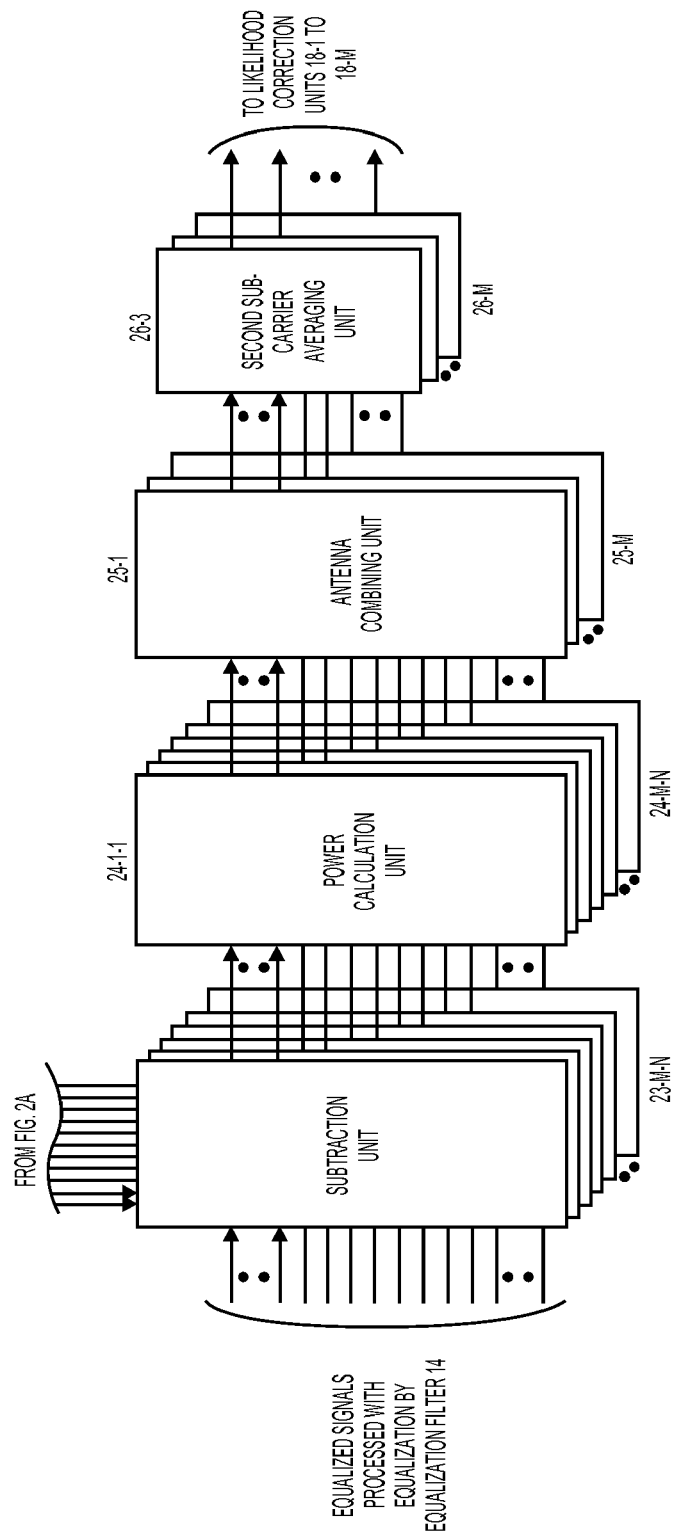

FIG. 2 is a block diagram showing a configuration of the residual interference calculation unit 17. Referring to FIG. 2, the residual interference calculation unit 17 includes first multiplication units 20-1-1 to 20-M-N;
first subcarrier averaging units 21-1-1 to 21-M-N;
second multiplication units 22-1-1 to 22-M-N;
subtraction units 23-1-1 to 23-M-N;
power calculation units 24-1-1 to 24-M-N;
antenna combining units 25-1 to 25-M; and
second subcarrier averaging units 26-1 to 26-M. The functions and the operations of the respective units now will be described in detail.

The first multiplication units 20-1-1 to 20-M-N input noise-suppressed frequency domain channel estimation values, output by the FFT units 12-1-1 to 12-M-N, and the equalizing weights, calculated by the weight calculating unit 13. The first multiplication units multiply the channel estimation values by the equalizing weights.

The first subcarrier averaging units 21-1-1 to 21-M-N subcarrier average a number equal to $N_{DFT}$ points, where $N_{DFT}$ is an integer greater than or equal to 2, of the channel estimation values and the equalizing weights, multiplied by each other in the first multiplication units 20-1-1 to 20-M-N, to calculate the channel gains after equalization.

The second multiplication units 22-1-1 to 22-M-N input the channel gains after equalization, calculated by the first subcarrier averaging units 21-1-1 to 21-M-N and the reference signals generated by the reference signal generating units 16-1 to 16-M. The second multiplication units multiply the channel gains after equalization with the reference signals.

The subtraction units 23-1-1 to 23-M-N subtract the reference signals, multiplied with the channel gains after equalization by the second multiplication units 22-1-1 to 22-M-N, from the equalized signals resulting from equalization by the equalization filter 14, to calculate an interference signal.

The power calculation units 24-1-1 to 24-M-N calculate the power of the interference signals calculated by the subtraction units 23-1-1 to 23-M-N.

The antenna combining units 25-1 to 25-M antenna-combine the interference signal power calculated by the power calculation units 24-1-1 to 24-M-N.

The second subcarrier averaging units 26-1 to 26-M subcarrier-average $N_{DFT}$ points of the interference signal power, antenna-combined by the antenna combining units 25-1 to 25-M, to calculate the residual interference. The calculated residual interferences are transmitted to the likelihood correction units 18-1 to 18-M of FIG. 1.

The likelihood correction units 18-1 to 18-M input equalized time domain signals, output from the IDFT units 15-1 to 15-M, and the residual interference, calculated by the residual interference calculation unit 17. The likelihood correction units 18-1 to 18-M find the bit likelihood from the equalized signal, and divide the bit likelihood thus found by the residual interference to correct the likelihood of the equalized signals.

With the present exemplary embodiment, as described above, the residual interference due to the interferences from other transmission antennas and multipath interferences are used for the likelihood correction of the equalized signals to achieve an optimum equalization performance.

Figure 3A:
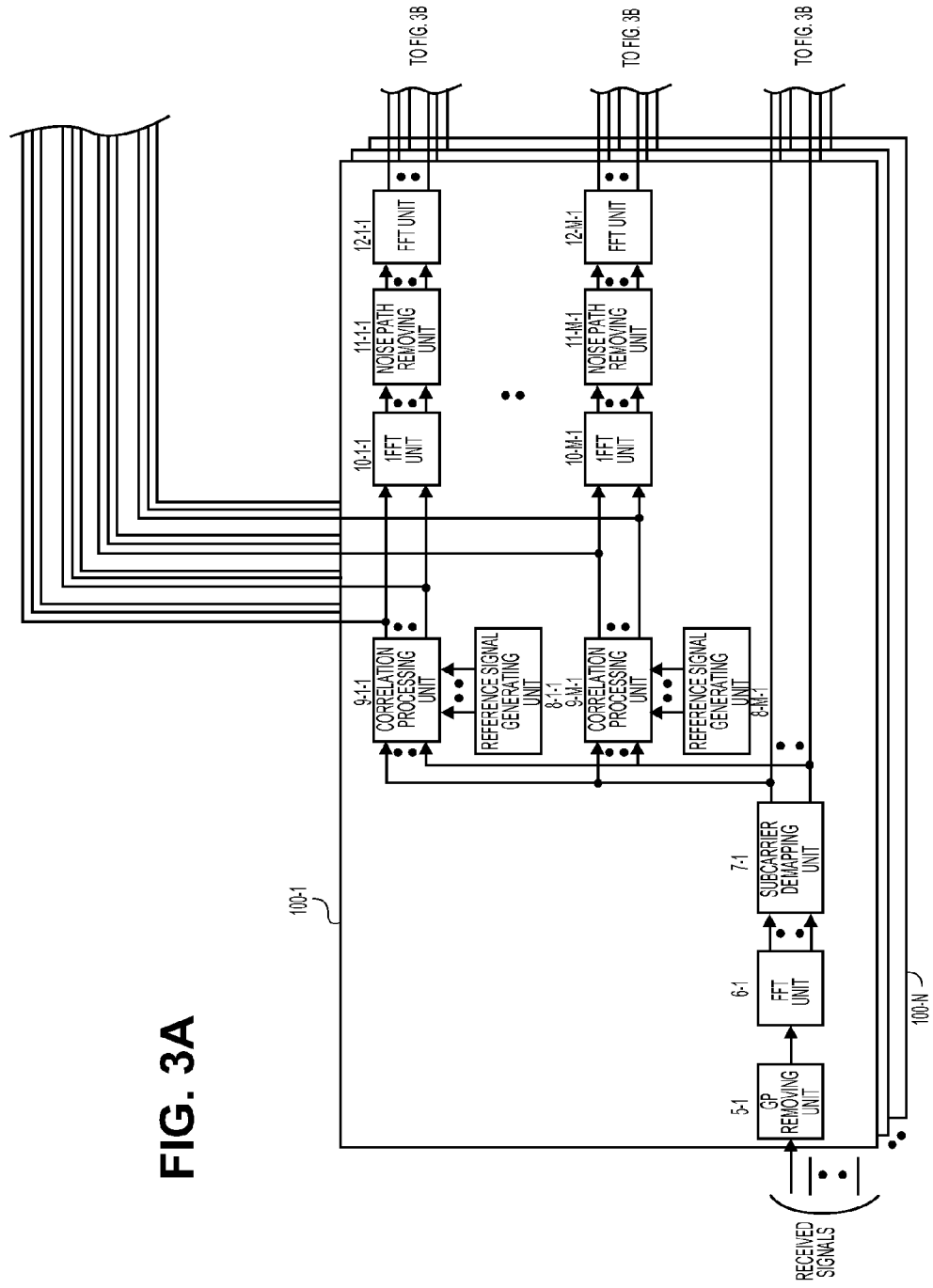
FIG. 3 is a block diagram showing a configuration of a MIMO receiving apparatus according to a second exemplary embodiment of the present invention.
Figure 3B:
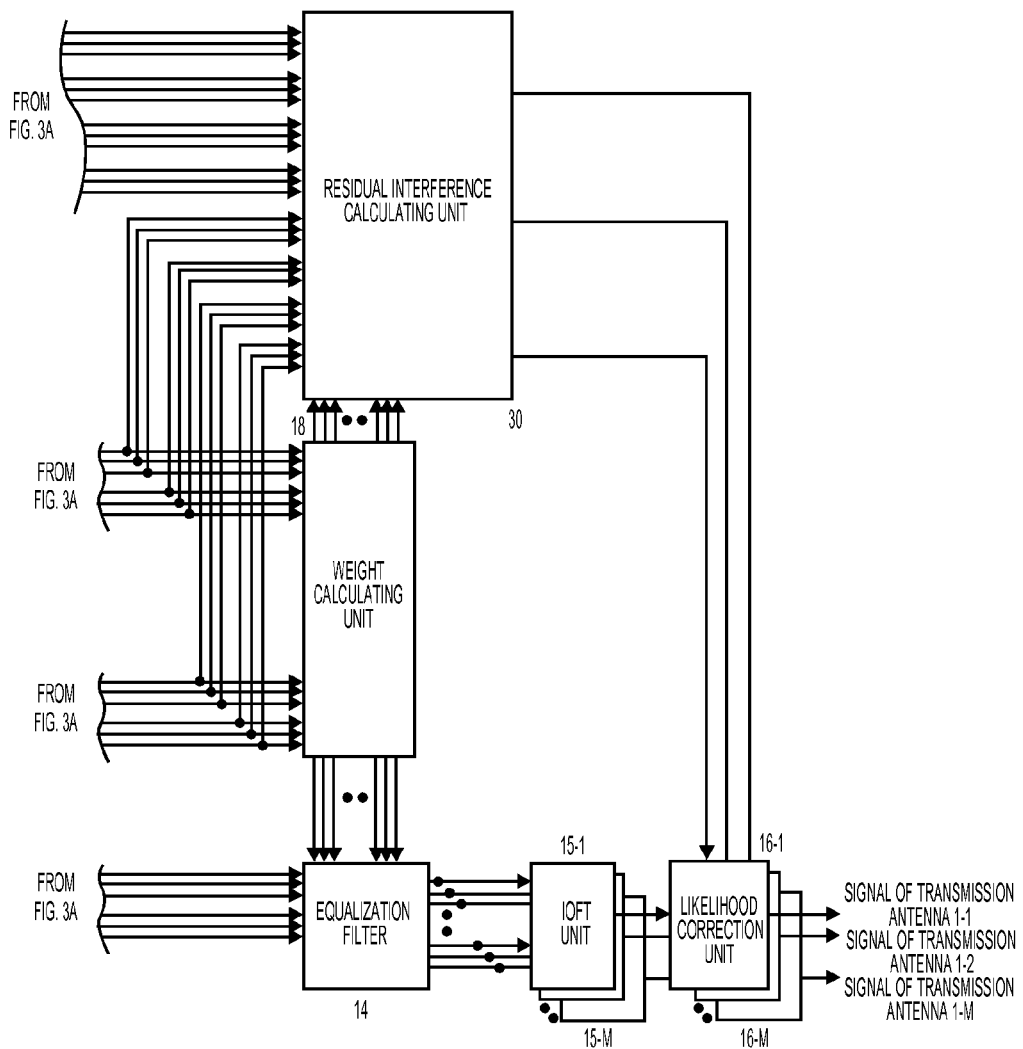

A second exemplary embodiment of the present invention will now be described with reference to the drawings. FIG. 3 is a block diagram showing a configuration of another MIMO receiving apparatus of the present invention. In FIG. 3, the components equivalent to those shown in FIG. 1 are indicated by the same reference numerals. The MIMO receiving apparatus of the second exemplary embodiment of the present invention includes CP removing units 5-1 to 5-N;
FFT units 6-1 to 6-N and 12-1-1 to 12-M-N;
subcarrier demapping units 7-1 to 7-N;
reference signal generating units 8-1 to 8-M;
correlation processing units 9-1-1 to 9-M-N;
IFFT units 10-1-1 to 10-M-N;
noise path removing units 11-1-1 to 11-M-N;
a weight calculating unit 13;
an equalization filter 14;
IDFT units 15-1 to 15-M;
likelihood correction units 18-1 to 18-M; and
a residual interference calculation unit 30.

With the present exemplary embodiment, the operation of various components, except the residual interference calculation unit 30, are the same as those of the first exemplary embodiment described above.

In the first exemplary embodiment, the residual interference calculation unit 17 calculates the residual interference using the noise-suppressed frequency domain channel estimation values, output from the FFT units 12-1-1 to 12-M-N, equalizing weights, obtained on calculation by the weight calculating unit 13, equalized signals, and reference signals. The equalized signal are obtained on equalization by the equalization filter 14, and the reference signals are generated by the reference signal generating units 16-1 to 16-M. In the present exemplary embodiment, the residual interference are calculated using the equalizing weights and channel estimation values before and after noise suppression without using the equalized signals or the reference signals.

The residual interference calculation unit 30 inputs
frequency domain channel estimation values as estimated by the correlation processing units 9-1-1 to 9-M-N;
noise-suppressed frequency domain channel estimation values as output from the FFT units 12-1-1 to 12-M-N; and equalizing weights as calculated by the weight calculating unit 13 to calculate residual interferences due to interferences from other transmission antennas and multipath interference.

The residual interferences In, at the transmission antenna m may be calculated, using the channel gains $G_{m,n}$, after equalization represented by the equation (9), in accordance with the following equation (11):

$$I_m = \frac{1}{N_{DFT}} \sum_{k=1}^{N_{DFT}} \sum_{n=1}^{N} |W_{m,n}(k) H_{BF,m,n}(k) - G_{m,n}|^2 \quad (11)$$

where $H_{BF,m,n}(k)$ is a frequency domain channel estimation value at the transmission antenna m and at the receive antenna n for the subcarrier k estimated by the correlation processing units 9-1-1 to 9-M-N.

Figure 4A:
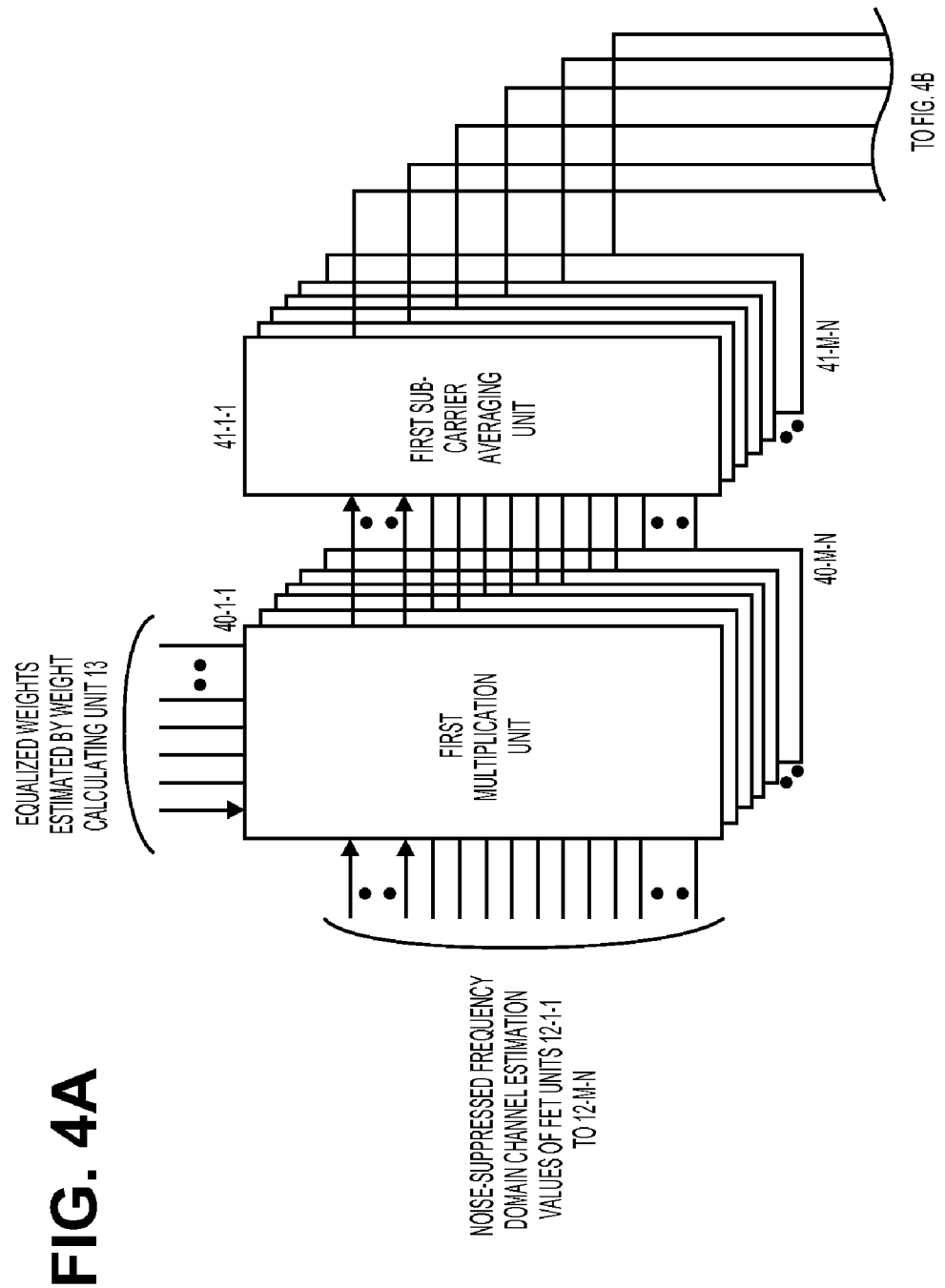
FIG. 4 is a schematic view showing a configuration of a residual interference calculation unit of the second exemplary embodiment of the present invention.
Figure 5:
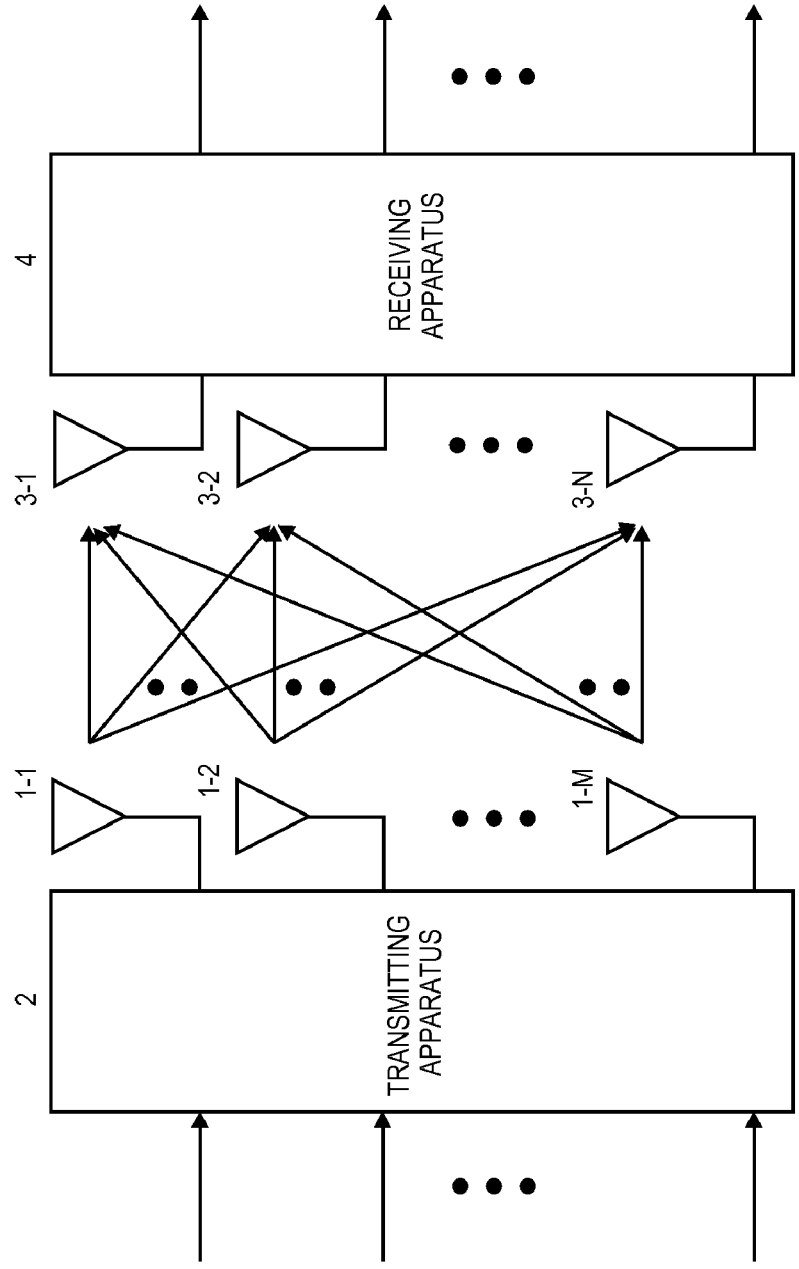
FIG. 5 is a schematic showing a typical configuration of a MIMO transceiver device.
Figure 6A:
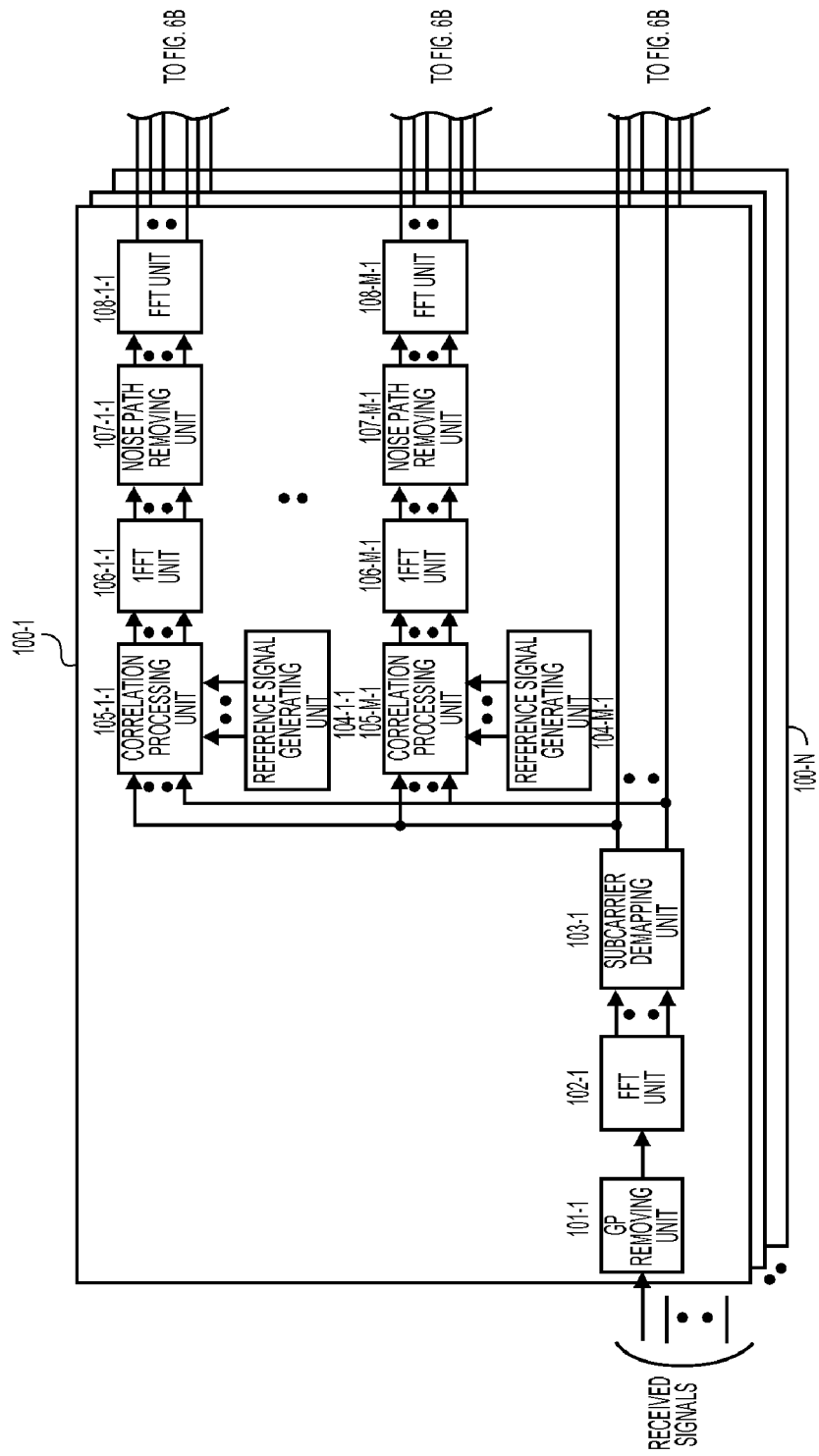
FIG. 6 is a block diagram showing a MIMO receiving apparatus of the related technique.
Figure 6B:
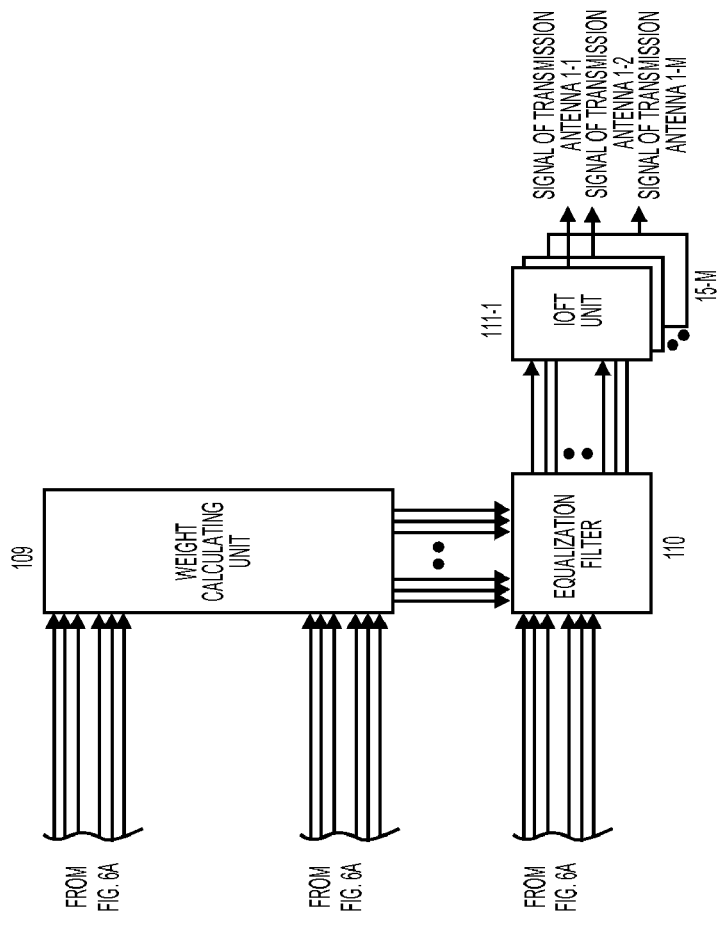

FIG. 4 is a block diagram showing a configuration of the residual interference calculation unit 30 of FIG. 3. Referring to FIG. 4, the residual interference calculation unit 30 includes first multiplication units 40-1-1 to 40-M-N;
first subcarrier averaging units 41-1-1 to 41-M-N;
second multiplication units 42-1-1 to 42-M-N;
subtraction units 43-1-1 to 43-M-N;
power calculation units 44-1-1 to 44-M-N;
antenna combining units 45-1 to 45-M; and
second subcarrier averaging units 46-1 to 46-M. The functions and the operations of the respective units are now explained in detail.

The first multiplication units 40-1-1 to 40-M-N input noise-suppressed frequency domain channel estimation values, output by the FFT units 12-1-1 to 12-M-N, and the equalizing weights, calculated by the weight calculating unit 13. The first multiplication units multiply the channel estimation values by the equalizing weights.

The first subcarrier averaging units 41-1-1 to 41-M-N subcarrier average a number equal to $N_{DFT}$ points, where $N_{DFT}$ is an integer greater than or equal to 2, of the channel estimation values and the equalizing weights, multiplied with each other by the first multiplication units 40-1-1 to 40-M-N, to calculate channel gains after equalization.

The second multiplication units 42-1-1 to 42-M-N input the frequency domain channel estimated values, estimated by the correlation processing units 9-1-1 to 9-M-N, and the equalizing weights calculated by the weight calculating unit 13, and multiply the channel estimation values with the equalizing weights.

The subtraction units 43-1-1 to 43-M-N subtract the channel gains after equalization, calculated by the first subcarrier averaging units 41-1-1 to 41-M-N, from the channel estimation values and the equalizing weights, multiplied by each other by the second multiplication units 42-1-1 to 42-M-N, to calculate an interference signal.

The power calculation units 44-1-1 to 44-M-N calculate the power of the interference signals calculated by the subtraction units 43-1-1 to 43-M-N.

The antenna combining units 45-1 to 45-M perform antenna-combining of the interference signal powers, calculated by the power calculation units 44-1-1 to 44-M-N.

The second subcarrier averaging units 46-1 to 46-M subcarrier-average Nun points of the interference signal power, that have undergone antenna-combining by the antenna combining units 45-1 to 45-M, to calculate the residual interference. The calculated residual interferences are transmitted to the likelihood correction units 18-1 to 18-M of FIG. 3.

The processing other than that performed by the residual interference calculation unit 30 is similar to the processing of the first exemplary embodiment and hence is not here described.

With the present exemplary embodiment described above, an optimum equalization performance may be realized by correcting the likelihood of the equalized signals using the residual interference due to interferences from other transmission antennas and the multipath interferences.

The above Examples are directed to an SU (Single User)-MIMO system as a MIMO receiving apparatus supposed to be provided with a plurality of transmission antennas. The present invention is not limited to this particular configuration, and may be applied to a MU (Multiple User)-MIMO system in which there is only one transmission antenna over which a plurality of users transmits simultaneously.

The above exemplary embodiments are directed to a MIMO receiving apparatus supposed to be provided with a plurality of transmission antennas. The present invention is not limited to this particular configuration, and may also be applied to a SISO (Single Input Single Output) system or to a SIMO (Single Input Multiple Output) system.

The present invention may also be applied to a radio apparatus of a base or mobile station of a mobile communication system.

The MIMO receiving apparatus of the present invention, transforming a single carrier signal into a frequency domain signal and which performs processing of equalization by signal processing in the frequency domain, may yield an optimum equalization performance through using residual interferences due to interferences from other transmission antennas and multipath interferences for the likelihood correction of the equalized signal.

The disclosures of the aforementioned Non-Patent Documents 1 and 2 are incorporated by reference herein. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

What is claimed is:

1. A receiving apparatus of a MIMO system comprising:
a unit that transforms a single carrier signal into a frequency domain signal and that performs processing of equalization by signal processing in the frequency domain;
a residual interference calculation unit that calculates a residual interference due to an interference from at least one of transmission antennas other than a transmission antenna of interest in a transmission side and to a multipath interference;
a likelihood correction unit that corrects a likelihood of an equalized signal using the residual interference;
an FFT (Fast Fourier Transform) unit that transforms a single-carrier signal received into a frequency domain signal and that outputs a noise-suppressed frequency domain channel estimation value;

a weight calculation unit that calculates an equalizing weight from the noise-suppressed frequency domain channel estimation value output from the FFT unit;

an equalization filter that performs the processing of equalizing a received signal in the frequency domain by the equalizing weight; and an IDFT (Inverse Discrete Fourier Transform) unit that transforms a frequency domain equalized signal by the equalization filter into a time domain equalized signal; wherein the likelihood correction unit corrects a likelihood of the equalized signal using the time domain equalized signal by the IDFT unit and the residual interference calculated by the residual interference calculation unit.

2. The receiving apparatus according to claim 1, further comprising a reference signal generating unit that generates a reference signal used for calculating the residual interference.

3. The receiving apparatus according to claim 2, wherein the residual interference calculation unit calculates the residual interference, using a noise-suppressed frequency domain channel estimation value output from the FFT unit;

an equalizing weight calculated by the weight calculation unit;

the equalized signal from the equalization filter; and the reference signal generated by the reference signal generating unit.

4. The receiving apparatus according to claim 2, wherein the residual interference calculation unit includes:

a first multiplication unit that multiplies the noise-suppressed frequency domain channel estimation value, output from the FFT unit, with an equalizing weight calculated by the weight calculation unit;

a first subcarrier averaging unit that performs subcarrier-averaging of the channel estimation value and the equalizing weight, which are multiplied to each other by the first multiplication unit, to calculate a channel gain after equalization;

a second multiplication unit that multiplies the channel gain after equalization, calculated by the first subcarrier averaging unit, with the reference signal generated by the reference signal generating unit;

a subtraction unit that subtracts the reference signal, multiplied by the second multiplication unit with the channel gain after equalization, from the equalized signal output by the equalization filter, to calculate an interference signal;

a power calculation unit that calculates the power of the interference signal calculated by the subtraction unit;

an antenna combining unit that performs antenna-combining of the power of the interference signal calculated by the power calculation unit; and a second subcarrier averaging unit that calculates a residual interference by performing subcarrier-averaging of the power of the interference signal, antenna-combined by the antenna combining unit, to calculate the residual interference.

5. The receiving apparatus according to claim 1, further comprising a correlation processing unit that estimates a frequency domain channel estimation value by correlation processing of a reference received signal and a reference signal.

6. The receiving apparatus according to claim 5, wherein the residual interference calculation unit calculates the residual interference, using a frequency domain channel estimation value estimated by the correlation processing unit;

the noise-suppressed frequency domain channel estimation value output from the FFT unit; and an equalizing weight calculated by the weight calculation unit.

7. The receiving apparatus according to claim 5, wherein the residual interference calculation unit includes:

a first multiplication unit that multiplies the noise-suppressed frequency domain channel estimation value, output from the FFT unit, with the equalizing weight calculated by the weight calculation unit;

a first subcarrier averaging unit that performs subcarrier-averaging of the channel estimation value and the equalizing weight multiplied by each other by the first multiplication unit to calculate a channel gain after equalization;

a second multiplication unit that multiplies the frequency domain channel estimation value estimated by the correlation processing unit with the equalizing weight calculated by the weight calculation unit;

a subtraction unit that subtracts a channel gain after equalization calculated by the first subcarrier averaging unit from the channel estimation value and the equalizing weight, multiplied by each other by the second multiplication unit, to calculate an interference signal;

a power calculation unit that calculates the power of the interference signal calculated by the subtraction unit;

an antenna combining unit that performs antenna-combining of the power of the interference signal calculated by the power calculation unit; and a second subcarrier averaging unit that calculates a residual interference by performing subcarrier-averaging of the power of the interference signal, antenna-combined by the antenna combining unit, to calculate the residual interference.

8. The receiving apparatus according to claim 1, wherein the weight calculation unit calculates the equalizing weight based on a MMSE (Minimum Mean Square Error) method or a ZF (Zero Forcing) method.

9. A radio communication terminal including the receiving apparatus according to claim 1.

10. A radio base station including the receiving apparatus according to claim 1.

11. A receiving method that transforms a single carrier signal into a frequency domain signal and that performs signal equalization by signal processing in the frequency domain, the method comprising:

calculating a residual interferences due to an interference from at least one of transmission antennas other than a transmission antenna of interest in a transmission side and to a multipath interference;

correcting the likelihood of the equalized signal using the residual interference;

deriving a noise-suppressed frequency domain channel estimation value;

calculating an equalizing weight from the noise-suppressed frequency domain channel estimation value;

equalizing a received signal in a frequency domain by the equalizing weight to yield an equalized frequency domain signal;

from other transmission antenna transforming an equalized signal in the frequency domain into the time domain; and wherein in correcting the likelihood of the equalized signal, the correction of the likelihood is performed using the equalized signal in the time domain and the residual interference.

12. The receiving method according to claim 11, comprising, in generating a reference signal used for calculating the residual interference and calculating the residual interference due to an interference from other transmission antenna and to a multipath interference, calculating the residual interference, using the noise-suppressed frequency domain channel estimation value;

the equalizing weight;

the equalized signal; and the reference signal.

13. The receiving method according to claim 11, comprising, in estimating a frequency domain channel estimation value by correlation processing of a reference received signal and a reference signal, and in calculating the residual interference due to an interference from other transmission antenna and to a multipath interference, calculating the residual interference, using a frequency domain channel estimation value by the correlation processing;

the noise-suppressed frequency domain channel estimation value; and the equalizing weight.

\* \* \* \* \*